United States Patent
Watanabe et al.

(10) Patent No.: US 6,821,594 B2
(45) Date of Patent: Nov. 23, 2004

(54) OXYGEN-ABSORBING LABEL

(75) Inventors: Yuichi Watanabe, Kanagawa (JP); Takahiro Seki, Chiba (JP); Masaki Nagata, Chiba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/386,452

(22) Filed: Mar. 13, 2003

(65) Prior Publication Data

US 2003/0175465 A1 Sep. 18, 2003

(30) Foreign Application Priority Data

Mar. 13, 2002 (JP) ........................................ 2002-068424

(51) Int. Cl.[7] .................................................. B32B 7/06
(52) U.S. Cl. ........................ 428/40.1; 206/204; 206/484; 252/188.1; 252/188.28; 428/40.2; 428/41.3; 428/41.5; 428/42.2; 428/42.3; 428/68; 428/72; 428/76; 428/188; 428/192; 428/194; 428/323; 428/913
(58) Field of Search ................................ 428/40.1, 40.2, 428/41.3, 41.5, 42.2, 42.3, 68, 72, 76, 188, 192, 194, 323, 913; 206/204, 484; 252/188.1, 188.28

(56) References Cited

U.S. PATENT DOCUMENTS 6,139,935 A  * 10/2000  Cullen et al. ................. 428/68

FOREIGN PATENT DOCUMENTS

| EP | 0657 277 A2 | 6/1995 |
| EP | 0695 626 a1 | 2/1996 |
| JP | 4-151555[5] | 5/1992 |

OTHER PUBLICATIONS

EPO Search Report, dated Dec. 22, 2003, for EP 03 00 5557.

* cited by examiner

*Primary Examiner*—Nasser Ahmad
(74) *Attorney, Agent, or Firm*—Antonelli, Terry, Stout & Kraus, LLP

(57) ABSTRACT

The oxygen-absorbing label of the present invention has a laminated structure successively comprising a base layer having a release adhesive layer on its surface, an oxygen-absorbing sheet made from an oxygen-absorbing resin comprising a thermoplastic resin and an oxygen absorbent blended therein, and an air-permeable layer. The air-permeable layer is bonded to the base layer at a position surrounding an outer periphery of the oxygen-absorbing sheet. The air-permeable layer comprises (A) a water-resistant moisture-permeable resin film having a water pressure resistance of 2,000 mmH$_2$O or higher and a moisture permeability of 1,000 g/m$^2$/24 h or higher and (B) a microporous film.

12 Claims, 1 Drawing Sheet

OXYGEN-ABSORBING LABEL

FIELD OF THE INVENTION

The present invention relates to an adhesively fixing oxygen-absorbing label, comprising an oxygen-absorbing sheet made of a resin composition blended with an oxygen-absorbing composition, and more particularly, to an oxygen-absorbing label having a water-resistant air-permeable layer for improving its water resistance required when applied to the preservation of foods.

RELATED ARTS

Conventionally, so-called oxygen-absorbing packages using oxygen absorbents have been widely used in order to realize oxygen-free packaging of oxygen-susceptible products such as foods and drugs, thereby maintaining good qualities thereof by preventing the deterioration in quality due to oxidation and the putrefaction due to breeding of microorganisms. Oxygen-absorbing packages are ordinary used in the form of an air-permeable small bag filled with granular or powdery oxygen absorbents. There have been recently developed an oxygen-absorbing sheet having an excellent oxygen removing capability which comprises, as an oxygen absorber, an oxygen-absorbing resin sheet produced by molding a thermoplastic resin blended with powdery oxygen absorbents such as iron powder-based oxygen absorbents into a sheet shape (Japanese Patent Application Laid-Open No. 2-72851).

The oxygen-absorbing sheet may be made into a multi-layer structure by covering an oxygen-absorbing sheet containing oxygen absorbents fixed in a thermoplastic resin with a film or sheet. The oxygen-absorbing sheet is suitably applied to an automatic labeling machine as compared to the small bag oxygen absorbents because the oxygen-absorbing sheet is free from leakage of the powdery oxygen absorbents due to rupture of the bag and can be made into a thin flat sheet with a uniform thickness. In view of the configuration and multi-layer structure of the oxygen-absorbing sheet, there have been proposed adhesive oxygen absorbers having a release adhesive layer on one surface of the oxygen-absorbing sheet. For example, Japanese Patent Application Laid-Open Nos. 7-219430 and 10-290915 propose oxygen-absorbing labels of laminated structures successively comprising a release layer, a base layer having a release adhesive layer, an oxygen-absorbing layer and an air-permeable layer in which the air-permeable layer is directly bonded to the base layer at portions surrounding an outer periphery of the oxygen-absorbing layer so as not to expose the oxygen-absorbing layer outside.

However, the conventional oxygen-absorbing labels containing iron as a main oxygen absorbent are usually provided at its surface contacting with products to be preserved with an air-permeable layer made of a porous material subjected to pore-forming procedure such as needle-perforation and stretching in order to ensure good oxygen absorbability by enhancing the air permeability. Therefore, when the oxygen-absorbing labels are used in packages for foods containing a large amount of water, the water enters into the inside of the oxygen-absorbing sheet through pores of the air-permeable layer under certain conditions, thereby causing undesired dissolution of the oxygen-absorbing components and rusts. The dissolved oxygen-absorbing components and rusts may ooze to the outer surface of the oxygen-absorbing label, resulting in deteriorated appearance of the packages.

In order to solve these problems, it is known that a non-porous film is used as the air-permeable layer to allow oxygen to permeate from the end surface of the film into the oxygen absorber, thereby preventing the rusts from oozing to the surface. However, in a water-requiring oxygen-absorbing sheet containing iron as a main oxygen absorbent, water inevitable for promoting the oxygen removal, together with oxygen, should be allowed to penetrate from the end surface, resulting in low oxygen-absorbing rate.

SUMMARY OF THE INVENTION

An object of the present invention is to provide an oxygen-absorbing label that is free from oozing of oxygen-absorbing components and rusts to the outer surface of the oxygen-absorbing label even when applied to foods containing a large amount of water.

As the result of extensive studies in view of the above object, the inventors have found that the above object can be achieved by an oxygen-absorbing label having, as an air-permeable layer, a laminated film comprising a water-resistant moisture-permeable resin film having a water pressure resistance of 2,000 mmH$_2$O or higher and a moisture permeability of 1,000 g/m$^2$/24 h or higher and a microporous film, without causing a substantial decrease in oxygen-absorbing rate. The present invention has been accomplished on the basis of this finding.

Thus, the present invention provides an oxygen-absorbing label exhibiting an improved water resistance, which has a laminated structure successively comprising a base layer having a release adhesive layer on its surface, an oxygen-absorbing sheet made from a oxygen-absorbing resin comprising a thermoplastic resin and an oxygen absorbent blended therein, and an air-permeable layer, wherein the air-permeable layer is bonded to the base layer at a portion surrounding an outer periphery of the oxygen-absorbing sheet, and the air-permeable layer comprises (A) a water-resistant moisture-permeable resin film having a water pressure resistance of 2,000 mmH$_2$O or higher and a moisture permeability of 1,000 g/M$^2$/24 h or higher and (B) a microporous film.

DETAILED DESCRIPTION OF THE INVENTION

Figure 1:
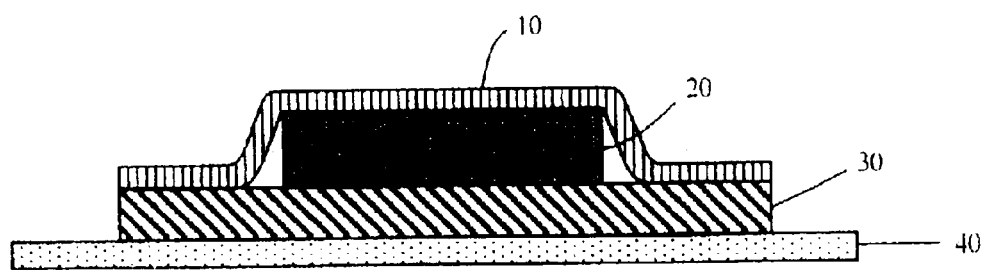
FIG. 1 shows a sectional view of an oxygen-absorbing label according to the present invention.

The oxygen-absorbing label of the present invention has a basic structure of base layer having a release adhesive layer on its surface/oxygen-absorbing sheet made from an oxygen-absorbing resin comprising a thermoplastic resin and an iron-based oxygen absorbent dispersed therein/air-permeable layer.

The respective layers constituting the oxygen-absorbing label are explained in detail below.

(1) Air-Permeable Layer

The air-permeable layer covers the oxygen-absorbing sheet to prevent the products being preserved from directly contacting therewith. The air-permeable layer also has a function of suitably allowing water vapor and oxygen to permeate therethrough, thereby enabling the oxygen absorbent in the oxygen-absorbing sheet to absorb oxygen.

The air-permeable layer comprises a substantially non-porous laminate comprising (A) a water-resistant moisture-permeable resin film having a water pressure resistance of 2,000 mmH$_2$O or higher and a moisture permeability of 1,000 g/m$^2$/24 h or higher and (B) a microporous film. The air-permeable layer is disposed in the oxygen-absorbing label such that the water-resistant moisture-permeable resin film (A) faces air and products to be preserved, and the microporous film (B) faces the oxygen-absorbing sheet.

The water-resistant moisture-permeable resin film (A) is a thermoplastic resin film having a water pressure resistance of 2,000 mmH$_2$O or higher, preferably 3,000 mmH$_2$O or higher and more preferably 4,000 mmH$_2$O or higher, and a moisture permeability of 1,000 g/m$^2$/24 h or higher, preferably 2,000 g/m$^2$/24 h or higher and more preferably 2,500 g/m$^2$/24 h or higher.

The water pressure resistance is measured according to JIS-L-1092B "High-Water-Pressure Method". If the water pressure resistance is less than 2,000 mmH$_2$O, when applied to high water-content foods, there occur problems such as the formation of rusts and the lowering of the oxygen-absorbing performance due to excessive amount of water entering into the oxygen-absorbing label, and the oozing-out of the rusts to an outer surface of the oxygen-absorbing label.

The moisture permeability is measured at 40° C. and a relative humidity of 90% according to JIS-Z-0208. If the moisture permeability is less than 1,000 g/m$^2$/24 h, there arises such a problem that an amount of water supplied through the air-permeable layer to the oxygen-absorbing sheet is insufficient, resulting in a low oxygen-absorbing rate.

The thickness of the water-resistant moisture-permeable resin film (A) is not particularly restricted as long as the above water pressure resistance and the moisture permeability are attained, and is preferably from 2 to 200 μm and more preferably from 10 to 100 μm in view of physical strength and flexibility of the film.

As a material of the water-resistant moisture-permeable resin film (A), there may be used poly(ether amide) block copolymers in view of their good moisture permeability, low costs, affinity to other resins, etc. The poly(ether amide) block copolymers are copolymers produced by copolycondensation of a reactive group-terminated polyether unit with a reactive group-terminated polyamide unit. More specifically, the poly(ether amide) block copolymers have the repeating units represented by the formula (1):

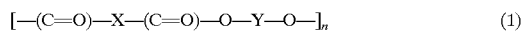

$$[-(C=O)-X-(C=O)-O-Y-O-]_n \qquad (1)$$

wherein X is a saturated linear aliphatic polyamide chain having an average molecular weight of 300 to 15,000 which is produced from a lactam or an amino acid having a C$_4$–C$_{14}$ hydrocarbon chain or by reacting a C$_6$–C$_{12}$ aliphatic dicarboxylic acid with a C$_6$–C$_9$ aliphatic diamine; Y is a polyoxyalkylene chain having a molecular weight of 6,000 or less derived from at least one linear chain or branched aliphatic polyoxyalkylene glycol; and n is the number of the repeating units which is sufficient to allow the poly(ether amide) copolymers to have an intrinsic viscosity of 0.8 to 2.05. Poly(ether amide) block copolymers described in U.S. Pat. No. 4,331,786 are usable.

The water-resistant moisture-permeable resin film (A) is a thermoplastic resin film whose surface and inside portion are substantially non-porous.

The water-resistant moisture-permeable resin film (A) prevents water except for water vapor from penetrating therethrough into the oxygen absorbent because of its high water pressure resistance, thereby inhibiting the formation of rusts and the lowering of the oxygen-absorbing performance due to excessive amount of water having entered into the oxygen absorbent.

The microporous film (B) is made of a porous material having a high air permeability, and laminated on the water-resistant moisture-permeable resin film (A) so as to face the oxygen-absorbing sheet.

Since the microporous film (B) has a high oxygen permeability, even when the oxygen permeability of the water-resistant moisture-permeable resin film (A) is not so high, a sufficient oxygen-absorbing rate is ensured by allowing oxygen to penetrate from the end surface of the microporous film (B).

The microporous film (B) may be made of any suitable material having a high oxygen permeability, such as water-resistant non-woven fabrics, polyolefin microporous films and synthetic papers. In view of air permeability, moisture permeability, water repellency, tear strength, etc., preferred are non-woven fabrics made of thermoplastic resins. The materials for the thermoplastic resin non-woven fabrics may include polyolefins, polyesters and polyamides. The non-woven fabrics are classified into a spun bonded fabric, a melt blown fabric, a carded fabric, an air laid fabric, etc. according to the difference in the production methods. The cross-sectional structure of the materials include a uniform structure and a sheath and core structure. Of the above, more preferred are polyolefin or polyester non-woven fabrics, and most preferred are high-density polyethylene spun-bonded fabrics. In particular, the microporous film (B) made of the high-density polyethylene spun bonded fabrics is readily bonded to the base film by heat-sealing because of its low melting point.

The thickness of the microporous film (B) is not particularly restricted as long as a sufficient oxygen permeability is ensured. In view of good physical strength and flexibility, the thickness of the microporous film (B) is preferably from 10 to 1,000 μm and more preferably from 30 to 500 μm.

The air-permeable layer may be a laminate of only the water-resistant moisture-permeable resin film (A) and the microporous film (B), or may be a laminate having one or more additional layers made of other components unless the properties and functions of the air-permeable layer are adversely affected. The laminate may be produced by known methods such as dry-lamination using an adhesive and extrusion-lamination.

One of the surfaces of the air-permeable layer faces products to be preserved and any desired prints may be provided thereon. The prints may be formed on a surface of the water-resistant moisture-permeable resin film (A), and an additional porous transparent film is preferably laminated on the printed surface as an outermost layer. Alternatively, a printed layer may be provided on a rear surface of the water-resistant moisture-permeable resin film (A) if it is see-through. In these manners, the printing ink is prevented from contacting the products to be preserved.

Figure 2:
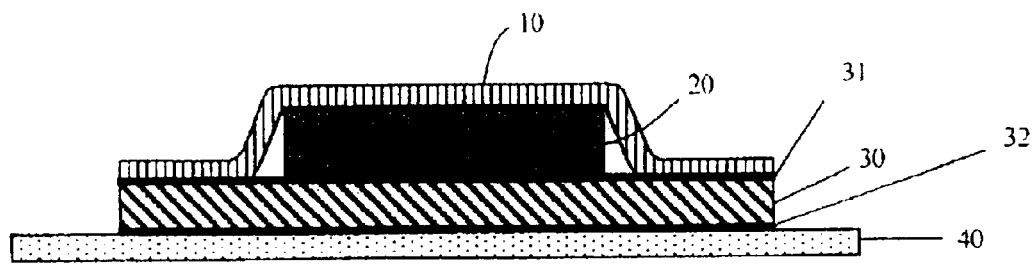
FIG. 2 shows a sectional view of another oxygen-absorbing label according to the present invention

The air-permeable layer of the oxygen-absorbing label has a size larger than that of the oxygen-absorbing sheet in order to prevent the end surface of the oxygen-absorbing sheet from being exposed outside. The air-permeable layer 10 is preferably bonded to the base layer 30 disposed on the release layer 40 through a release adhesive layer 32 at the portions surrounding an outer periphery of the oxygen-absorbing sheet 20 through an adhesive layer 31, as illustrated in FIGS. 1 and 2.

The air-permeable layer may be bonded to or may be not bonded to the oxygen-absorbing sheet. If the air-permeable layer is bonded to the oxygen-absorbing sheet, care should be taken so as not to inhibit the penetration of water vapor and oxygen through the bonded portion into the oxygen-absorbing sheet.

(2) Oxygen-Absorbing Sheet

The oxygen-absorbing sheet used in the present invention is made of an oxygen-absorbing resin composition comprising a thermoplastic resin and an oxygen absorbent dispersed therein, and is a microporous sheet piece produced by stretching the oxygen-absorbing resin composition in at least one direction.

The thermoplastic resin used in the oxygen-absorbing sheet is preferably olefin-based resin such as low-density polyethylene, high-density polyethylene, polypropylene, ethylene-α-olefin copolymer, and polymethylpentene.

Examples of the oxygen absorbent include metallic oxygen absorbents containing, as the main ingredient, metals represented by iron powder, and organic oxygen absorbents containing, as the main ingredient, organic components such as ascorbic acid and derivatives thereof, polyhydric alcohols and polyhydric phenols, with iron powder-based oxygen absorbents being particularly preferred. The iron powder-based oxygen absorbent is a composition containing iron powder and a metal halide. Especially preferred is an iron powder-based oxygen absorbent containing iron powder coated with the metal halide or iron powder to which the metal halide is dispersedly adhered. The oxygen absorbent may also contain, if desired, an auxiliary component such as activated carbon, lime, diatomaceous earth, zeolite and inorganic salts.

Examples of the iron powder used in the iron powder-based oxygen absorbent include reduced iron powder, electrolytic iron powder and atomized iron powder. The particle size of the iron powder is preferred to be finer. Specifically, the average particle size is preferably 200 $\mu$m or smaller and more preferably 150 $\mu$m or smaller. Examples of the metal halides include sodium chloride, potassium chloride, barium chloride, calcium chloride, magnesium chloride, sodium bromide, potassium bromide, barium bromide, calcium bromide, magnesium bromide, sodium iodide, potassium iodide, barium iodide, calcium iodide and magnesium iodide. The metal halide is used in an amount of 0.1 to 15 parts by weight and preferably 0.1 to 5 parts by weight based on 100 parts by weight of the iron powder.

The oxygen-absorbing sheet is produced by melt-kneading 85 to 25 parts by weight of the oxygen absorbent with 15 to 75 parts by weight of the thermoplastic resin into a sheet form, and then, stretching the sheet in at least one direction. The stretch ratio is preferably 1.5 to 15 times and more preferably 3 to 12 times. The resultant oxygen-absorbing sheet has a microporous structure by the stretching. The thickness of the stretched oxygen-absorbing sheet is selected according to objects and applications thereof, and is usually from 0.05 to 3 mm.

To impart a practical oxygen-absorbing performance as an oxygen-absorbing label of a single-side absorption type of the present invention, the oxygen absorption rate of the oxygen-absorbing sheet is preferably 100 ml/m$^2$/h or higher at 25° C. and more preferably 200 ml/m$^2$/h or higher at 25° C. The oxygen absorption rate of such a range is achieved by selecting the stretching conditions from the above-specified ranges so as to render the oxygen-absorbing sheet microporous.

The oxygen absorbent contained in the oxygen-absorbing sheet and the production method of the oxygen-absorbing sheet are not particularly restricted as long as meeting the object of the present invention.

For example, a thermoplastic resin having an oxygen-absorbing composition mainly comprising a reducing inorganic or organic substance dispersed therein is made into a sheet form, or a thermoplastic resin such as polyolefin and polyamide having a transition metal catalyst such as cobalt and iron dispersed therein is made into a sheet form. In view of the oxygen-absorbing performance, preferred are resin sheets containing an oxygen-absorbing composition mainly comprising iron powder, and more preferred are microporous sheets prepared by stretching a resin sheet dispersedly incorporated with an oxygen-absorbing composition mainly comprising iron powder.

The oxygen-absorbing sheet used in the present invention may be notched or perforated to render it flexible.

The oxygen-absorbing sheet requiring water for its oxygen-absorbing reaction may be used either as a water-dependent or a self-reactive oxygen absorber. The use as the water-dependent oxygen absorber utilizing water evaporated from products being preserved is preferred in view of easiness of production and good handling property.

The oxygen-absorbing sheet may be also laminated with an additional layer such as a moisture absorption layer, a water retention layer, a gas adsorption layer, a gas generation layer and a deodorant layer, unless the oxygen-absorbing performance of the oxygen-absorbing sheet is adversely affected. The additional layer may be adhesively laminated, for example, onto a surface of the oxygen-absorbing sheet which is opposed to the surface facing the air-permeable layer. Alternatively, an additional layer provided with air-permeable holes or an additional layer with its adhesive layer provided with air-permeable holes may be disposed or adhesively laminated between the oxygen-absorbing sheet and the air-permeable layer. In any event, it is important to ensure a good moisture permeability of the water-resistant moisture-permeable resin film (A) and a good oxygen permeability of the microporous film (B).

The oxygen-absorbing label acquires a good deodorizing effect by laminating a deodorant layer.

The deodorant layer is made of an air-permeable material blended with a deodorant. The preferred deodorant is activated carbon. The activated carbon used in the deodorant layer is preferably a powder of under 200 mesh which passes through a 200 mesh screen, and more preferably a fine powder of under 350 mesh which passes through a 350 mesh screen.

Examples of the air-permeable material include filter paper, cellulose pulp, cellulose woven fabric and non-woven fabric. The deodorant layer may be bonded by ordinary methods such as extrusion lamination, dry lamination and hot-melt bonding, with the extrusion lamination being especially preferred.

The deodorant layer is preferably made of an activated carbon-containing paper (hereinafter referred to merely as "activated carbon paper") prepared by mixing an powdery activated carbon with a binder mainly composed of pulp and forming the resultant mixture into a paper, or a non-woven fabric prepared from a mixture of fibrous activated carbon and resin fibers. The activated carbon paper is preferred in view of low costs, a good handling property, etc. The activated carbon paper preferably contains activated carbon in an amount of 5% by weight or higher.

(3) Base Layer

The base layer is disposed between the oxygen-absorbing sheet and the release layer. The base layer may be constituted by a substrate and a release adhesive layer. The release layer is releasably bonded to the base layer through the release adhesive layer. The base layer may or may not be bonded to the oxygen-absorbing sheet through an adhesive layer. The base layer is bonded to the microporous film (B) of the air-permeable layer through an adhesive layer at a portion surrounding the outer periphery of the oxygen-absorbing sheet.

The base layer may be constituted only by the release adhesive layer and disposed between the oxygen-absorbing sheet and the release layer. In this structure, the base layer (the release adhesive layer) is bonded to a rear surface of the oxygen-absorbing sheet, and to the microporous film (B) of the air-permeable layer at a portion surrounding the outer periphery of the oxygen-absorbing sheet.

The release adhesive layer used in the base layer is made of a pressure-sensitive adhesive, and bonds the base layer and the release layer described in detail below. Further, upon the use of the oxygen-absorbing label, after releasing the release layer, the adhesive layer adhesively fixes the oxygen-absorbing label to the inside of a packaging container. The release adhesive layer is made of, for example, at least one pressure-sensitive adhesive selected from the group consisting of copolymers and block copolymers of acryl type, styrene-isoprene-styrene type, styrene-butadiene type, styrene-butadiene-styrene type, and styrene-ethylene/butylene-styrene type. The release adhesive layer may contain in addition to the above main components, any suitable additives such as tackifier to control an adhesion strength. The release adhesive layer may be formed by conventionally known methods such as coating and lamination.

As the substrate of the base layer, there may be used plastic film, non-woven fabric or paper. The base layer is formed by providing a release adhesive layer on one surface of the substrate, and optionally providing an adhesive layer on the other surface. In particular, it is preferred to laminate a thermoplastic resin film on the substrate to make the base layer heat-sealable to the air-permeable layer.

The substrate used in the base layer also serve as a display label by printing information on the surface of the substrate which faces the release adhesive layer, and providing thereon a transparent release adhesive layer. The printed information such as product names and notices are readily seen from the outside of a transparent package with the oxygen-absorbing label attached to the inside thereof. Further, the use of concealing prints, opaque substrates or an opaque release adhesive or adhesive layer is preferable since an aesthetic appearance is ensured by hiding the inside of the oxygen-absorbing label to maintain the product value.

The adhesive layer bonds the base layer and the microporous film (B) of the air-permeable layer at the periphery of the oxygen-absorbing sheet. The "bonding" referred to in this invention means the fixing of both surfaces to be bonded with each other including the adhesion by pressure-sensitive adhesives, adhesives or hot-melts and heat-seal by heat fusion. The above definition is similarly applicable to the air-permeable layer. The adhesive layer may be formed by conventionally known methods such as coating and lamination.

(4) Release Layer

The release layer not only protects the adhesive surface of the base layer before use, but also functions as a support for a continuous web of oxygen-absorbing labels. The release layer is peeled off from the oxygen-absorbing label at the use thereof. The release layer may be constituted of papers, films or metal foils each being coated with a release agent such as silicone resins and paraffin waxes. The release agent may be selected according to properties of the release adhesive layer on the base layer so as to attain an appropriate releasability.

The release layer may be made of any suitable material meeting a mechanical strength required during the production and use of the oxygen-absorbing label or the continuous web of oxygen-absorbing labels. The material is appropriately selected in view of rigidity, shrinkage and moisture absorptivity so as not to cause the dimensional difference between the release layer and other layers in some processing conditions, thereby preventing warping and peel-off. The release layer is ordinarily made of paper, but is preferably made of plastic films or metal foils which are free from the formation of paper dusts during the processing, because a recent demand for dust-free environmental conditions in food production fields can be satisfied.

The oxygen-absorbing label of the present invention is produced by successively laminating the release layer, the base layer having the release adhesive surface, the oxygen-absorbing sheet and the air-permeable layer. The oxygen-absorbing labels may be intermittently bonded on a strip of the release layer to form a web of continuous oxygen-absorbing labels.

The oxygen-absorbing label of the present invention is a thin flat plate with a smooth surface and a sufficient flexibility. It is also good at adhesive fixing and makes no strange impression. The oxygen-absorbing label has a thickness of usually 0.1 to 5 mm and preferably 0.2 to 3 mm. A smaller thickness is preferable to avoid difficulties in winding the continuous web and handling in a labeling machine. The individual oxygen-absorbing label has any optional shape depending upon applications, for example such as square, rectangle, circle and ellipse.

The center of each oxygen-absorbing label of the present invention has a basic construction of air-permeable layer (water-resistant moisture-permeable resin film (A)/microporous film (B))/oxygen-absorbing sheet/bonding layer/base layer/release adhesive layer/release layer. An additional layer such as deodorant layer may be disposed between the air-permeable layer and the base layer as long as the moisture permeability of the water-resistant moisture-permeable resin film (A) and the oxygen permeability of the microporous film (B) are ensured.

The oxygen-absorbing label of the present invention is produced, for example, by the following methods.

Method (1)

A base layer is previously provided with a release layer adhered to one surface and an exposed adhesive surface on the other. An oxygen-absorbing sheet is adhesively fixed to the exposed adhesive surface of the base layer, and an air-permeable layer is further laminated thereon so as to completely cover the base layer. The air-permeable layer is pressed against the base layer at a portion surrounding the outer periphery of the oxygen-absorbing sheet to completely bond the air-permeable layer to the base layer. Then, a trimming die is pressed down from the outer periphery of the oxygen-absorbing sheet to the base layer (half cut), and the die-cut outer portion of the base layer and the air-permeable layer is removed from the release layer, thereby producing a continuous web of oxygen-absorbing labels.

Method (2)

A base layer is provided with a release layer adhered to one surface thereof through a release adhesive layer, and an exposed heat-sealing layer on the other surface. An oxygen-absorbing sheet and an air-permeable layer are successively overlaid on heat-sealing layer of the base layer. A heating jig of a given shape is pressed down at a portion surrounding the outer periphery of the oxygen-absorbing sheet so as to heat-seal the base layer and the air-permeable layer. Then, a trimming die is pressed down from the outer periphery of the oxygen-absorbing sheet to the base layer, and the half-cut outer portion of the base layer and the air-permeable layer is removed from the release layer, thereby producing a continuous web of oxygen-absorbing labels.

Method (3)

An oxygen-absorbing sheet is adhered to an air- and moisture-permeable adhesive applied onto a surface of a microporous film (B) of an air-permeable layer. On the oxygen-absorbing sheet, is overlaid a base layer with a release layer adhered to a back surface thereof through an adhesive layer, thereby adhering the base layer and the air-permeable layer at a portion surrounding the outer periphery of the oxygen-absorbing sheet through the air- and moisture-permeable adhesive applied to the surface of the microporous film (B). Then, a trimming die is pressed down from the outer periphery of the oxygen-absorbing sheet, and the half-cut outer unnecessary portion is removed from the release layer, thereby producing a continuous web of oxygen-absorbing labels.

In any of the above methods, a continuous web of oxygen-absorbing labels intermittently arranged on a strip of the release layer is produced. The production process may be performed in a continuous manner. In the above methods, if the laminate is not half-cut but completely cut to the release layer by a trimming die, individual oxygen-absorbing labels are produced as separate pieces. Separate oxygen-absorbing labels may also be produced by cutting the continuous web. The process for producing the oxygen-absorbing label of the present invention is not limited to the above methods as long as the requirements of the present invention are satisfied.

The present invention will be described in more detail below with reference to the following examples. However, these examples are only illustrative and not intended to limit the present invention thereto.

EXAMPLE 1

Production of Air-Permeable Layer

On an unrolled strip of a high-density polyethylene spun bonded nonwoven fabric (trade name "Tyvek" available from DuPont), was extrusion-laminated a poly(ether amide) block copolymer resin (trade name "PEBAX MV3000SA" Elf Atochem Corp.; water pressure resistance: 10,000 $mmH_2O$; moisture permeability: 5,000 $g/m^2/24$ h) from an extrusion laminating machine at an extrusion rate of 25 kg/h while controlling the line speed so as to obtain a film having a thickness of 25 μm, followed by press-bonding by nip rolls. The obtained laminate was slit into a 25 μm-thick continuous strip as an air-permeable film having a structure of non-porous, water-resistant, moisture-permeable poly (ether amide) block copolymer resin film (A)/high-density polyethylene spun-bonded non-woven fabric (B) (microporous film).

Production of Oxygen-Absorbing Sheet

Coated iron powder was prepared by coating 100 parts by weight of the iron powder with 2.5 parts by weight of calcium chloride. A mixture of 100 parts by weight of the coated iron powder having an average particle size of 70 μm and 40 parts by weight of a high-density polyethylene was kneaded and extruded into a sheet made of an oxygen-absorbing resin composition. The obtained sheet was stretched 5 times in its longitudinal direction to obtain a ribbon of microporous oxygen-absorbing resin sheet having a thickness of 0.6 mm. The oxygen-absorbing resin sheet had an oxygen absorption rate of 200 ml $O_2/m^2/h$ or higher at 25° C.

By passing through a roll having parallel lattice blades arranged at 4 mm intervals, parallel notches were formed on one surface of the raw oxygen-absorbing resin sheet in a notch depth leaving an unnotched portion of 0.06 mm thick. Then, the notched resin sheet was die-cut to prepare blackish gray rectangular oxygen-absorbing sheets (20 mm×18 mm×0.6 mm).

Production of Base Layer Having Release Layer

A continuous strip (36 mm wide) of a rayon non-woven fabric having a basis weight of 40 $g/m^2$ was used as the base layer. An acrylic adhesive was applied on both surfaces of the base layer. One of the adhesive-coated layers is referred to as "release adhesive layer", and the other is referred to as "adhesive layer". A continuous strip of a release paper having a silicone coat on its both surfaces and the same width as that of the base layer was laminated over the release adhesive layer to prepare a base layer having release layer.

Production of Oxygen-Absorbing Label

In a first step, the oxygen-absorbing sheets were intermittently adhered to the adhesive layer of the continuous strip of the base layer having release layer at a parallel intervals of 35 mm with its shorter side perpendicular to the longitudinal direction of the continuous strip, while facing the notched surface (non-bonding side) upward.

In a second step, the continuous strip of the air-permeable layer was overlaid on the oxygen-absorbing sheets adhered to the base layer in the first step. The air-permeable layer was adhered to the base layer through the adhesive layer by pressing it against the adhesive layer of the base layer at a portion surrounding the outer periphery of the rectangular oxygen-absorbing sheet.

In a third step, the resultant laminate was die-cut into a rectangular shape having a layered structure of air-permeable layer/bonding layer/base layer/adhesive layer with the lowermost release layer remained uncut by pressing down a rectangular trimming die (32 mm×30 mm) at the bonding portion of the air-permeable layer and the base layer surrounding the outer periphery of the oxygen-absorbing sheet.

In a fourth step, after removing the portion of air-permeable layer/bonding layer/base layer/adhesive layer around the die-cut portion including the rectangular oxygen-absorbing sheet, the resultant continuous web was taken up into a roll on a plastic core having a diameter of 130 mm, thereby obtaining a rolled continuous oxygen-absorbing label (web) comprising a plurality of rectangular oxygen-absorbing labels (32 mm×30 mm) adhered to a strip of release layer (release paper).

Evaluation Tests (1) Oxygen-Absorbing Performance Test

The oxygen-absorbing label, after releasing the release layer, was fixedly adhered through its exposed adhesive surface to the inner surface of a three-side sealed bag (inside dimension: 100 mm×100 mm) made of a gas barrier film: KON (15 μm)/PE (20 μm)/LLDPE (60 μm). The bag with the oxygen-absorbing label attached was filled with a cotton impregnated with 5 ml of distilled water and 50 ml of air, and the opening was heat-sealed to form a closed packaging bag. The same procedure was repeated to obtain three closed bags, which were kept in a room at 25° C. After 15 h, the oxygen gas concentrations in the bags were measured by gas chromatograph, showing that the oxygen concentrations in all the three bags were reduced to less than 0.1% by volume.

(2) Food Preservation Test

The oxygen-absorbing label, after releasing the release layer, was fixedly adhered through its exposed adhesive surface to the inner surface of a three-side sealed bag (inside dimension: 180 mm×250 mm) made of a gas barrier film, KON (15 μm)/PE (20 μm)/LLDPE (60 μm). Into the bag with the oxygen-absorbing label attached, about 50 g of sliced ham was placed with 50 ml of air, and the opening was closed by heat sealing.

The sliced ham package was placed with its gas-barrier film carrying the oxygen-absorbing label down so as to allow the sliced ham to be placed directly on the oxygen-absorbing label. Further, a bag filled with about 200 g of water was put as a weight on the sliced ham through the gas barrier film of the bag to bring the sliced ham into close contact with the oxygen-absorbing label. The same procedure was repeated to prepare five similar packages containing the sliced ham directly placed on the oxygen-absorbing label. These packages were stored at 5° C. After 30 days, the appearance of the oxygen-absorbing labels and sliced hams were visually observed. No abnormal change was found on the surface of the oxygen-absorbing labels and the appearance of sliced hams of any five packages.

EXAMPLE 2

An oxygen-absorbing label was produced and evaluated in the same manner as in Example 1 except for using 2.5 parts by weight of sodium bromide to coat 100 parts by weight of iron powder in the production of the oxygen-absorbing sheet.

As a result of the oxygen-absorbing performance test in the same manner as in Example 1, the oxygen concentrations in all the bag was reduced to less than 0.1% by volume after 15 h. As a result of the food preservation test, like Example 1, no abnormal change was found after 30-day preservation.

Comparative Example 1

The same procedure as in Example 1 was repeated to produce a rolled continuous web of oxygen-absorbing labels comprising rectangular oxygen absorbers (32 mm×30 mm) adhered to a strip of the release layer (release paper), except for using a film prepared by dry-laminating a perforated PET/PE film on an oil- and water-resistant paper as the an air-permeable layer. The air-permeable layer was disposed with its PE layer facing the products being preserved. The oxygen-absorbing labels were subjected to the oxygen-absorbing performance test and food preservation test in the same manner as in Example 1.

As a result of the oxygen-absorbing performance test, the oxygen concentrations in all the three bags were reduced to less than 0.1% by volume. However, as a result of the food preservation test, rusts were formed on the surface of the oxygen-absorbing label in one of the five bags.

Comparative Example 2

The same procedure as in Example 1 was repeated to produce a rolled continuous web of oxygen-absorbing labels comprising rectangular oxygen absorbers (32 mm×30 mm) adhered to a strip of the release layer (release paper), except for using a film prepared by dry-laminating a non-perforated PET/PE film on an oil- and water-resistant paper as the an air-permeable layer. The air-permeable layer was disposed with its PE layer facing the products being preserved. The oxygen-absorbing labels were subjected to the oxygen-absorbing performance test and food preservation test in the same manner as in Example 1.

As a result of the oxygen-absorbing performance test, the oxygen concentrations in all the three bags were reduced to only 10±0.5% by volume after stored for 15 h. showing that the oxygen absorption rates were low.

As is apparent from the above, the oxygen concentration in the bag was reduced to less than 0.1% by volume after storage for 15 h when the oxygen-absorbing label of the present invention was used. This is because that a rapid oxygen removing effect is attained by a rapid supply of a sufficient amount of water to the oxygen-absorbing sheet through the water-resistant moisture-permeable resin film (A) comprising the non-porous poly(ether amide) block copolymer having a high moisture permeability in spite of its non-porous structure; and by an oxygen supply to the oxygen-absorbing sheet at a sufficiently high speed due to the high air permeability of the microporous film (B).

Further, no ooze of rust was observed when the oxygen-absorbing label of the present invention was used, because the non-porous poly(ether amide) block copolymer resin layer constituting the water-resistant moisture-permeable resin film (A) has a high moisture permeability and a high water resistance in spite of its non-porous structure Thus, by using the combination of the water-resistant moisture-permeable resin film (A) and the microporous film (B) as the air-permeable layer, the ooze of rust of the oxygen absorbent blended in the oxygen-absorbing sheet can be prevented in the oxygen-absorbing label of the present invention.

Further, the oxygen-absorbing rate is prevented from being lowered by a rapid supply of water evaporated from products being preserved to the oxygen-absorbing sheet through the water-resistant moisture-permeable resin film (A) having a high moisture permeability, and by a rapid supply of oxygen in the inner atmosphere to the oxygen-absorbing sheet through the microporous film (B) having a high oxygen permeability. Accordingly, the oxygen-absorbing label of the present invention is suitably applied to preservation of products requiring a rapid removal of oxygen.

What is claimed is:

1. An oxygen-absorbing label which has a laminated structure successively comprising a base layer having a release dhesive layer on its surface, an oxygen-absorbing sheet made from an oxygen-absorbing resin comprising a thermoplastic resin and an oxygen absorbent blended therein, and an air-permeable layer, wherein the air-permeable layer is bonded to the base layer at a position surrounding an outer periphery of the oxygen-absorbing sheet, and the air-permeable layer comprises (A) a water-resistant moisture-permeable resin film having a water pressure resistance of 2,000 mmH$_2$O or higher and a moisture permeability of 1,000 g/m$^2$/24 h or higher and (B) a microporous film, the water-resistant moisture-permeable resin film (A) being made of a poly(ether amide) block copolymer.

2. The oxygen-absorbing label according to claim 1, wherein the poly(ether amide) block copolymer has a linear aliphatic polyamide chain and a polyoxyalkylene chain.

3. The oxygen-absorbing label according to claim 1, wherein the water-resistant moisture-permeable resin film (A) is a non-porous resin film.

4. The oxygen-absorbing label according to claim 1, wherein the microporous film (B) is made of a non-woven fabric.

5. The oxygen-absorbing label according to claim 1, wherein the release layer is a strip to form a web.

6. The oxygen-absorbing label according to claim 1, wherein the water-resistant moisture-permeable resin film has a water pressure resistance of 3,000 mmH$_2$O or higher and a moisture permeability of 2,000 g/m$^2$/24 h or higher.

7. The oxygen-absorbing label according to claim 1, wherein the water-resistant moisture-permeable resin film has a water pressure resistance of 4,000 mmH$_2$O or higher and a moisture permeability of 2,500 g/m$^2$/24 h or higher.

8. The oxygen-absorbing label according to claim 1, wherein the water-resistant moisture-permeable resin film has a thickness of 2 to 200 μm.

9. The oxygen-absorbing label according to claim 1, wherein the poly (ether amide) block copolymer has the following repeating unit represented by the formula (1):

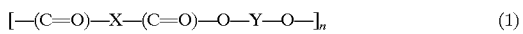

where X is a saturated linear aliphatic polyamide chain having an average molecular weight of 300 to 15,000, Y is a polyoxyalkylene chain having a molecular light of 6,000 or less, and n is the number of repeating units which is sufficient to allow the poly (ether amide) to have an intrinsic viscosity of 0.8 to 2.05.

10. The oxygen-absorbing label according to claim 1, wherein the oxygen-absorbing sheet is laminated with at least one additional layer selected from the group consisting of a moisture absorption layer, a water retention layer, a gas adsorption layer, a gas generation layer and a deodorant layer.

11. The oxygen-absorbing label according to claim 10, wherein said at least one additional layer is positioned on a surface of the oxygen-absorbing sheet opposite the surface thereof facing the air-permeable layer.

12. The oxygen-absorbing label according to claim 10, wherein said at least one additional layer includes said deodorant layer, said deodorant layer including activated carbon.

* * * * *